US006654437B2

United States Patent
Mazuy

(10) Patent No.: US 6,654,437 B2
(45) Date of Patent: Nov. 25, 2003

(54) METHOD OF REPAIRING A LABYRINTH SEAL OF A DIFFUSER IN A PRIMARY PUMP OF A NUCLEAR POWER STATION

(75) Inventor: Louis Mazuy, Maubeuge (FR)

(73) Assignee: Jeumont S.A., Courbe Voie (FR)

( * ) Notice: Subject to any disclaimer, the term of this patent is extended or adjusted under 35 U.S.C. 154(b) by 0 days.

(21) Appl. No.: 10/094,630

(22) Filed: Mar. 12, 2002

(65) Prior Publication Data

US 2002/0126791 A1 Sep. 12, 2002

(30) Foreign Application Priority Data

Mar. 12, 2001 (FR) .......................................... 01 03336

(51) Int. Cl.⁷ .............................................. G21C 19/00
(52) U.S. Cl. ....................... 376/260; 376/372; 376/392; 376/203; 415/173.5
(58) Field of Search ................................ 376/203, 261, 376/451

(56) References Cited

U.S. PATENT DOCUMENTS

| 4,587,076 A | * | 5/1986 | Bonhomme ................. 277/348 |
| 4,657,171 A | * | 4/1987 | Robins ....................... 228/119 |
| 4,688,990 A | * | 8/1987 | Boster ........................ 277/634 |

FOREIGN PATENT DOCUMENTS

| DE | 3111442 | 11/1982 | ............... 415/170.1 |
| EP | 0817205 | 1/1998 | ................. 376/260 |
| FR | 2647854 | 12/1990 | ................. 276/260 |
| GB | 2290999 A | * 1/1996 | |
| JP | 60053891 | 3/1985 | ............... 415/170.1 |
| JP | 06117394 | 4/1994 | ............... 415/170.1 |

OTHER PUBLICATIONS

French Search Report dated Oct. 2001, No. FA 604447, pp. 1–2.

* cited by examiner

*Primary Examiner*—Charles T. Jordan
*Assistant Examiner*—Rick Palabrica
(74) *Attorney, Agent, or Firm*—Connolly Bove Lodge & Hutz, LLP

(57) ABSTRACT

The invention relates to a method of repairing the labyrinth seal of a diffuser in a primary pump, the diffuser being of the type comprising a peripheral skirt and a circular end wall having an orifice provided with the labyrinth seal. The method consists in making a bore in the circular end wall having a diameter greater than that of the orifice, in reducing the thickness of the remaining portion of the end wall, in forming a chamfer on the edge of the bore, in positioning a replacement part in said bore, the replacement part including a central orifice and a chamfer on its own peripheral edge, in making a bead of welding between the chamfers, and in making a new labyrinth seal in the central orifice of the replacement part.

6 Claims, 2 Drawing Sheets

METHOD OF REPAIRING A LABYRINTH SEAL OF A DIFFUSER IN A PRIMARY PUMP OF A NUCLEAR POWER STATION

The present invention relates to a method of repairing a labyrinth seal of a diffuser in a primary pump of a nuclear power station.

BACKGROUND OF THE INVENTION

A nuclear power station primary pump comprises a drive shaft for rotating a wheel, and above said wheel and concentrically about said shaft, a heat exchanger forming a thermal barrier, a thermal barrier cover comprising a peripheral skirt provided at its base with a rim extending beneath the heat exchanger, and a pump diffuser comprising a peripheral skirt concentric with said peripheral skirt of the thermal barrier cover and provided at its base with a circular end wall extending beneath the rim of said body.

This type of primary pump also has a ring known as the "labyrinth" ring disposed between the heat exchanger and the shaft, and a body having the heat exchanger and the peripheral skirt of the thermal barrier cover fixed thereto. The body is connected to the thermal barrier cover by link elements.

In addition, the circular end wall of the diffuser has a central bore through which the shaft passes, where it is provided with a succession of circumferential and superposed rings forming a lip seal of the labyrinth type.

The labyrinth seal is thus provided in a solid part, and the circular end wall of the diffuser carrying said labyrinth seal is placed in a transition zone between the hot water of the primary circuit which is at a temperature of about 300° C. and the cooled zone of the pump which is at a temperature of about 40° C.

The circular end wall of the diffuser, and consequently also the labyrinth seal, are thus both subject to a large temperature gradient which encourages the formation of thermal fatigue cracks on the lips of the seal.

OBJECTS AND SUMMARY OF THE INVENTION

An object of the invention is thus to provide a method of repairing the labyrinth seal of a primary pump diffuser in a nuclear power station, said diffuser comprising a peripheral skirt provided at its base with a circular end wall having an orifice provided with said labyrinth seal, and the method consisting in:

making a bore in the circular end wall of diameter greater than the orifice so as to withdraw a central portion of the end wall and eliminate the labyrinth seal;

reducing the thickness of the remaining portion of the end wall in the vicinity of the bore;

forming a chamfer on the edge of the bore;

positioning a replacement part in said bore, the replacement part having a central orifice, and the peripheral edge of said part being provided with a chamfer;

providing a continuous and leakproof bead of welding between the two chamfers;

making flush the flash on the bead of welding; and making lips to form a new labyrinth seal in the central orifice of the replacement part.

According to other characteristics of the invention:

the axis of symmetry of the chamfers of the remaining portion of the circular end wall and of the replacement part is parallel to the axis of the central orifice;

the axis of symmetry of the chamfers of the remaining portion of the circular end wall and of the replacement part forms an angle relative to the axis of the central orifice that is acute and that has a vertex situated beneath said circular end wall;

the bottom face of the replacement part is situated substantially in the same plane as the bottom face of the circular end wall of the diffuser; and the bottom face of the replacement part is situated above the bottom face of the circular end wall of the diffuser.

BRIEF DESCRIPTION OF THE DRAWINGS

The characteristics and advantages of the invention appear from the following description given by way of example and made with reference to the accompanying drawings, in which.

MORE DETAILED DESCRIPTION

Figure 1:
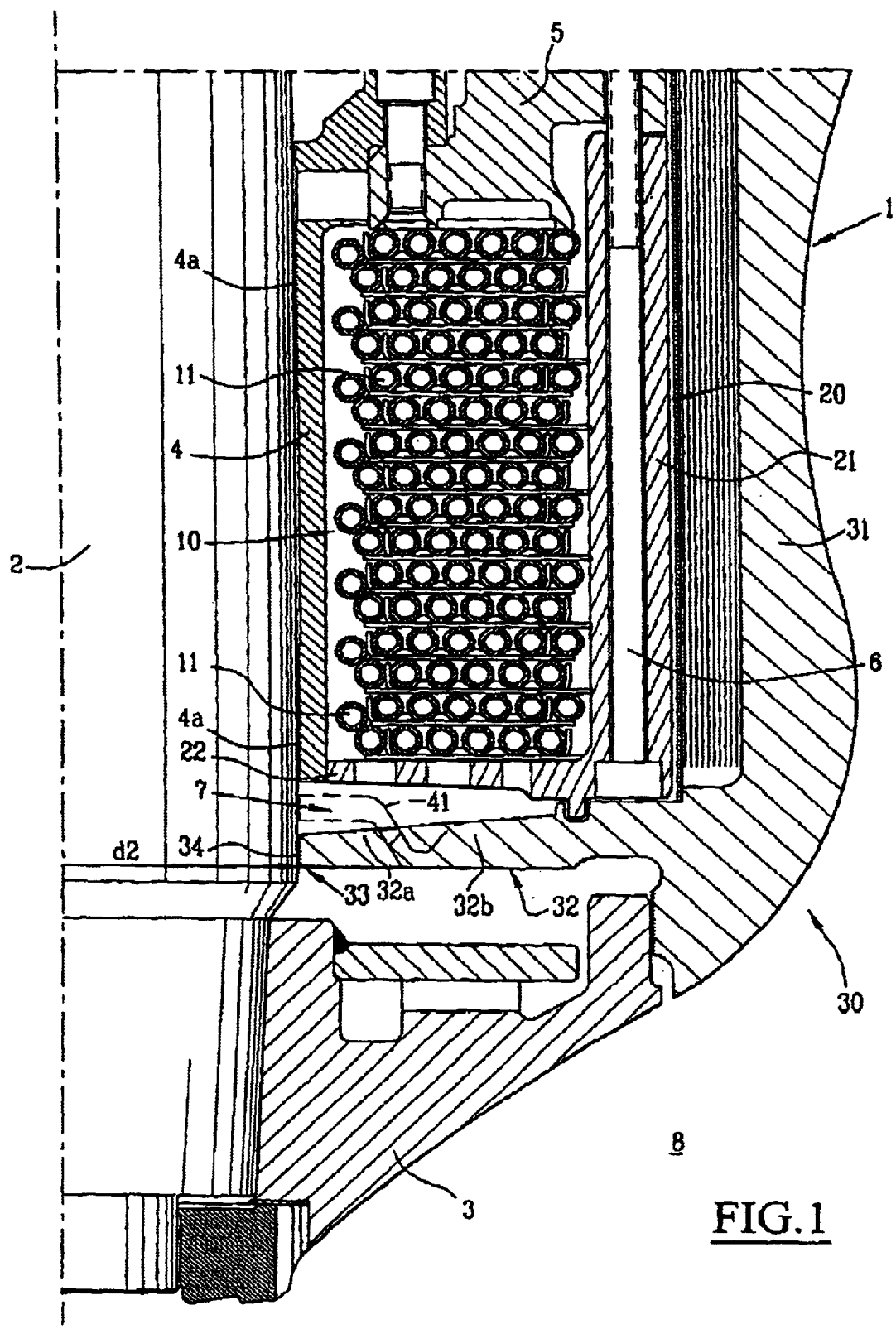
FIG. 1 is a diagrammatic half-axial section view showing a portion of a primary pump in a nuclear power station.

FIG. 1 is a diagram showing a portion of a primary pump in a nuclear power station, which pump is of the single-stage helico-centrifugal type with vertical suction and horizontal delivery.

The pump is given overall reference 1 and comprises a drive shaft 2 for rotating a wheel 3 fixed by appropriate means to the base of said shaft 2. Above the wheel 3 and concentrically about the shaft 2, the pump also comprises a heat exchanger 10 forming a thermal barrier, a thermal barrier cover 20, and a diffuser 30.

The heat exchanger 10 is made up of a multitude of concentric tubes 11 distributed in superposed sheets, and a ring 4 is disposed between the shaft 2 and the heat exchanger 10.

On the inside, respectively near the top and near the bottom, the ring 4 carries respective mechanical seals 4a of the labyrinth type.

The thermal barrier cover 20 comprises a peripheral skirt 21 extending over the full height of the heat exchanger 10, and provided at its base with a circular rim 22 extending beneath said heat exchanger 10.

The diffuser 30 is formed by a peripheral skirt 31 surrounding the peripheral skirt 21 of the thermal barrier cover 20 and provided at its base with a circular end wall 32 extending beneath the rim 22 of said thermal barrier cover 20.

The primary pump 1 also comprises a body 5 having the heat exchanger 10 and the peripheral skirt 21 of the thermal barrier cover 20 fixed thereto.

The skirt 21 of the thermal barrier cover 20 is fixed to the body 5 by link elements 6 constituted by studs, for example.

As shown in FIG. 1, the rim 22 of the thermal barrier cover body 20 co-operates with the circular end wall 32 of the diffuser 30 to define a bottom chamber for cold water given overall reference 7.

The circular end wall 32 of the diffuser 30 is provided with an orifice 33 for passing the shaft 2 and comprising a succession of superposed circumferential rings forming a lip seal, also referred to as a labyrinth seal 34.

In conventional manner, the wheel 3 constrained to rotate with the shaft 2 sucks in primary circuit fluid, and this fluid is delivered via a delivery orifice 8 shown in part in FIG. 1 and situated beside the diffuser 30.

The diffuser 30 is thus in contact with primary circuit fluid which is at a temperature of about 300° C. The circular end wall 32 of the diffuser 30 carrying the labyrinth seal 34 is thus disposed in a transition zone between the hot water of the primary circuit which is at a temperature of about 300° C. and the cooled zone of the pump which is at a temperature of about 40° C. As a result, this circular end wall 32, and consequently also the labyrinth seal 34, are both subject to a large temperature gradient which encourages thermal fatigue cracking to form on the rings making up the seal.

To replace this labyrinth seal 34, the method of the invention thus consists in making a bore 40 through the circular end wall 32 of the diffuser 30, which bore 40 (FIG. 2) is of diameter d1 and is greater than the diameter d2 of the orifice 33 (FIG. 1) so as to remove a central portion 32a of said circular end wall 32 and remove the cracked labyrinth seal 34.

Thereafter, by means of a suitable machining operation, the thickness of the remaining portion 32b of the end wall 32 is reduced in the vicinity of the bore 40, e.g. by forming a groove 35 of shape which is determined so as to reduce the thermomechanical stress intensity factor in the end wall 32 of the diffuser 30.

Figure 2:
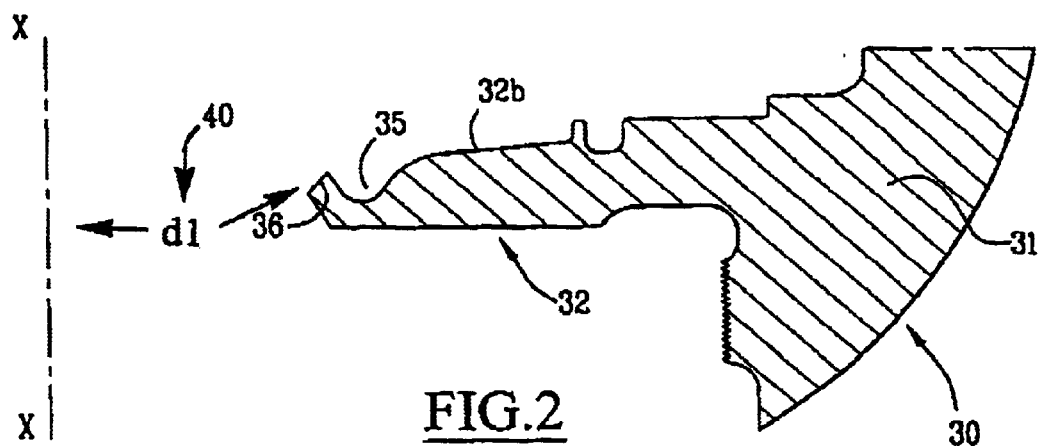
FIGS. 2 to 4 are axial half-section views of the circular end wall of the diffuser showing the various steps in the repair method of the invention.

After this machining operation, a chamfer 36 is formed on the edge of the bore 40, as shown in FIG. 2.

Figure 3:
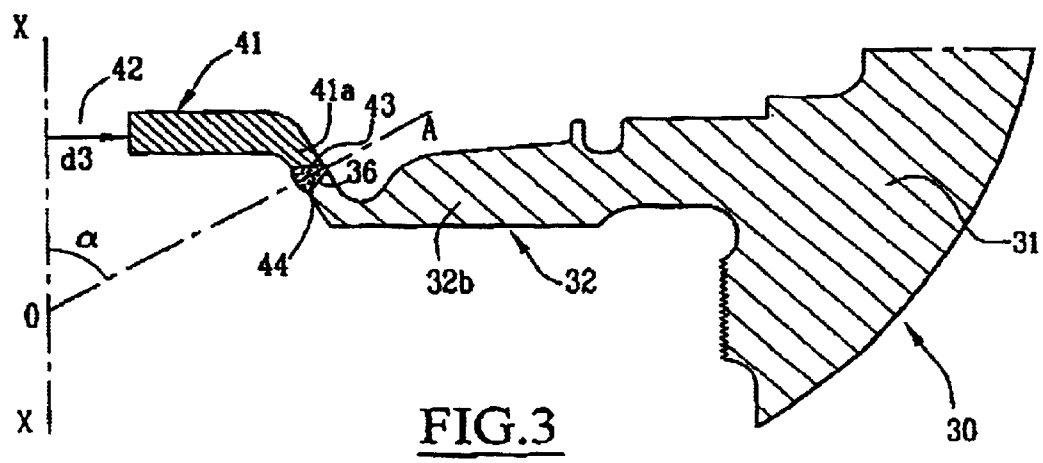

As shown in FIG. 3, a replacement part 41 is positioned in the bore 40, and this replacement part 41 has a central orifice 42 of diameter d3 corresponding substantially to the diameter d2 of the orifice 33 of the previously removed central portion 32a.

The peripheral edge 41a of this replacement part 41 is provided with a chamfer 43.

As shown in FIG. 3, the axis of symmetry A of the chamfers 36 and 43 is at an acute angle α relative to the axis XX of the central orifice 42 with the vertex O thereof being situated beneath the circular end wall 32 of the diffuser 30, as shown in FIG. 3.

In a variant, the axis of symmetry A of the chamfers 36 and 43 could be parallel to the axis XX of the central orifice 42.

After positioning the replacement part 41 in such a manner that the chamfer 43 faces the chamfer 36 of the remaining portion 32b of the end wall 32, a bead of continuous and leakproof welding 44 is made between these two chamfers, as shown in FIG. 3.

The bead of welding 44 is made, for example, using an automated tungsten inert gas (TIG) method or electric arc welding, or using any other welding method.

Thereafter, the top and bottom flash on the bead of welding 44 is made flush and the bead of welding is inspected using a non-destructive technique, e.g. using ultrasound.

Figure 4:
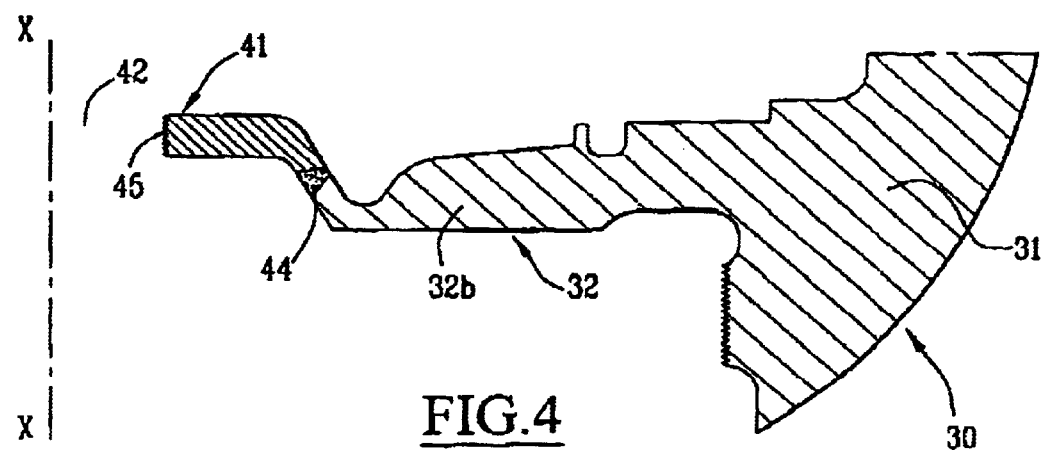

Finally, the central orifice 42 of the replacement part 41 has lips 45 made on its inside edge so as to form a new labyrinth seal, as shown in FIG. 4.

The geometrical shape of the replacement part 41 is determined so that its bottom face is situated above the bottom face of the circular end wall 32 of the diffuser 30.

In a variant, the bottom face of the replacement part 41 is situated substantially in the same plane as the bottom face of the circular end wall 32 of the diffuser 30.

In general, the welding method for providing the bead of welding 44 is selected so as to minimize deformation in the diffuser 30.

In addition, the new shape of the portion 41 on which the new labyrinth seal is made enables the stress intensity factor to be reduced by changing the thermomechanical stress field.

This shape also makes it possible to transform a portion of the stresses into deformation that gives rise to no drawbacks for proper operation of the primary pump.

This modification makes it possible to reduce the risks of cracks forming on the lips of the labyrinth seal.

What is claimed is:

1. A method of repairing the labyrinth seal of a nuclear power station primary pump diffuser, said diffuser including a peripheral skirt provided at its base with a circular end wall having an original central orifice, a wall of the central orifice having the labyrinth seal formed therein, the method comprising the steps:

enlarging the original orifice of the circular end wall for removing a central portion of the circular end wall and eliminating the labyrinth seal;

reducing a thickness of a remaining portion of the circular end wall adjacent to the enlarged orifice;

forming a circular chamfer in a wall of the enlarged orifice;

positioning a circular replacement part in the enlarged orifice, the replacement part including a reduced central orifice having the same diameter as the original orifice;

forming a circular chamfer in a peripheral edge of the replacement part;

positioning the chamfer of the enlarged orifice in spaced adjacent relation to the chamfer of the peripheral edge;

welding the two chamfers;

smoothing a flash on a resulting bead of welding; and forming a new labyrinth seal in the reduced central orifice of the replacement part.

2. The method set forth in claim 1, wherein an axis of symmetry of the chamfers of a remaining portion of the circular end wall and of the replacement part is parallel to an axis of the reduced central orifice of the replacement part.

3. The method set forth in claim 1, wherein an axis of symmetry of the chamfers of the remaining portion of the circular end wall and of the replacement part forms an angle relative to an axis of the reduced central orifice of the replacement part that is acute and that has a vertex situated beneath the circular end wall.

4. The method set forth in claim 1, wherein a bottom face of the replacement part is situated substantially in a same plane as a bottom face of the circular end wall of the diffuser.

5. The method set forth in claim 1, wherein a bottom face of the replacement part is situated above a bottom face of the circular end wall of the diffuser.

6. The method set forth in claim 1, wherein the step of reducing a thickness of a remaining portion of the circular end wall comprises the step of forming a circular groove in a radially inward end of the remaining portion adjacent to the enlarged orifice.

* * * * *